Dec. 12, 1939. H. SELITZKY 2,183,370
LIQUID MEASURING AND DISPENSING DEVICE
Filed July 15, 1936
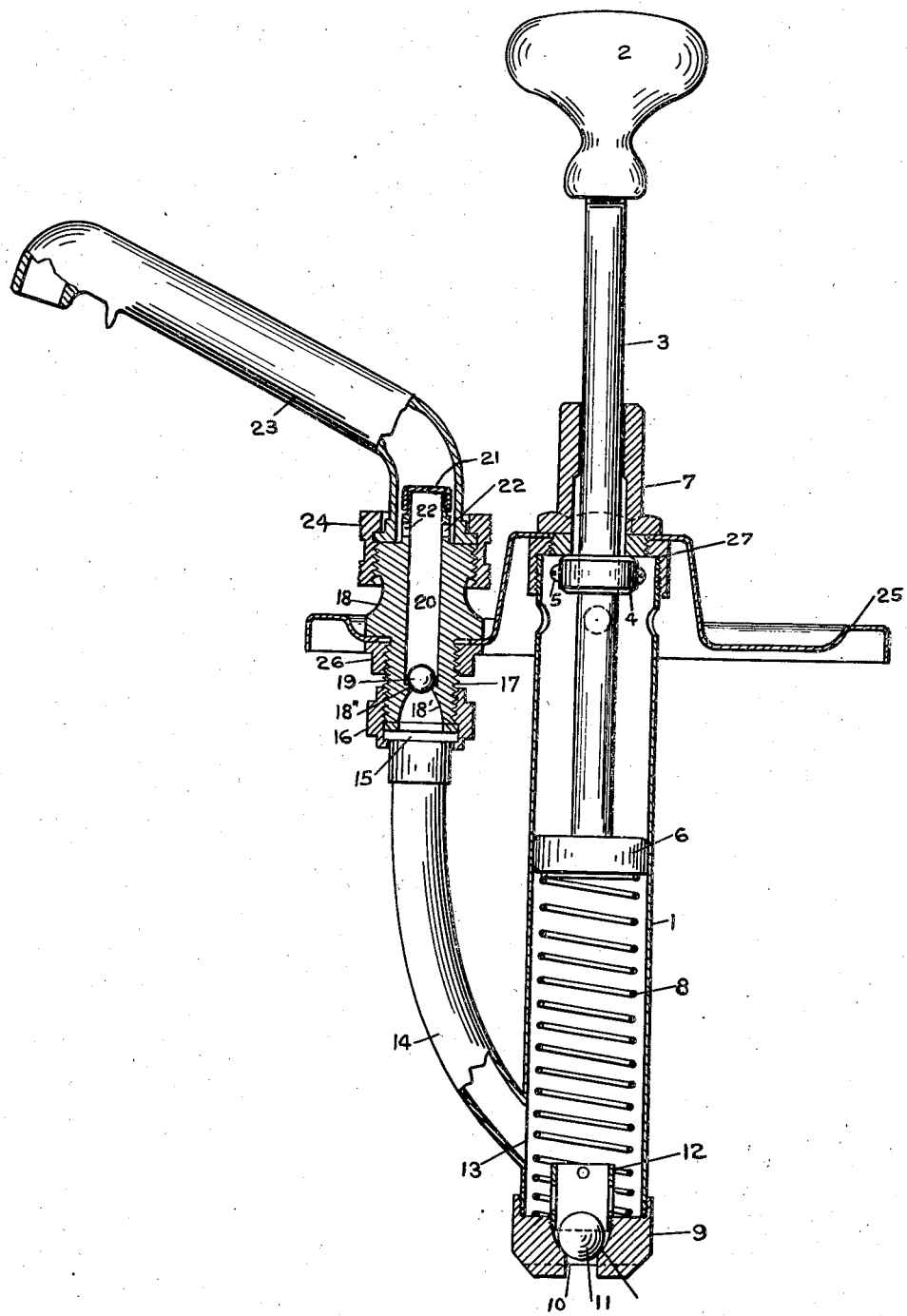
INVENTOR.
Henry Selitzky
BY S. J. Cox
ATTORNEY.

Patented Dec. 12, 1939

2,183,370

UNITED STATES PATENT OFFICE 2,183,370

LIQUID MEASURING AND DISPENSING DEVICE

Henry Selitzky, Brooklyn, N. Y.

Application July 15, 1936, Serial No. 90,711

3 Claims. (Cl. 225—35)

The present improvements relate, in general, to liquid dispensers, and more particularly to means for insuring an even flow of liquid from the dispenser, and means for measuring the correct amount of liquid.

A primary object of the improvements is to provide a method whereby the amount of liquid dispensed may be accurately measured and readily adjusted. Another object of the invention is to provide means whereby the residue drip from the dispenser spout will be eliminated or at least minimized.

Heretofore there has been extreme difficulty in regulating the primary flow of liquid from the dispenser so that a spurt does not result, and a consequent spilling from the receptacle into which the liquid is being dispensed.

A further object is to provide a check valve chamber and valve therein in the outlet tube of the dispenser, of such a design and arrangement that there will be an even flow of liquid throughout and excess or spurting thus prevented.

A still further object of the invention is to provide a dispenser which is particularly adapted for use in soda fountains, restaurants, kitchen and similar places.

Other objects and advantages of the improvements will be apparent to those skilled in the art upon reference to the following specification and the accompanying drawing in which the figure is a vertical medial cross section of a dispenser embodying the said improvements.

Referring to the drawing the mechanism is shown in a position ready to dispense liquid.

The piston 6 moves vertically within the confines of the piston barrel 1 when knob or handle 2 is forced in a downward direction, the force being transmitted from the handle 2 to the piston 6 through the medium of the rod 3 which passes through the bushing 7 which serves as a guide, the downward stroke of the piston being limited by contact between the knob and top of bushing. A dispensing adjustment collar 4 is mounted on the rod 3 and held in position by a set screw 5. Said adjustment collar may be moved vertically within the piston barrel its position determining the length of up stroke of the piston and thereby regulating the amount of liquid to be dispensed at each operation. The piston barrel 1 is provided with external threads at its lower end and the interiorly threaded valve cap 9 is screwed thereon. The valve cap 9 is provided with a round flanged orifice 10, at the center of its bottom, in which the ball valve 11 is seated, said ball valve being prevented from escaping by the cage 12. The lower end of the piston 6 rests upon the compression spring 8 whose opposite extremity is seated in the valve cap 9; thus when the piston 6 is thrust downwardly it returns to its normal position by the thrust of the spring 8. At one side of the piston barrel 1 is provided an opening 13 which communicates with the outlet tube 14 terminating in the horizontally extending flange 15. Over this is placed the clamp nut 16 which makes a tight fitting joint with the threads 17 of the check valve body 18. The bore 18' of the check valve 18 narrows cone-like to a point where the valve ball 19 seats thereon, on the annular ledge 18''. The chamber 20, which is a continuation of the bore, extends upwardly and has a uniform diameter which will just permit the ball valve 19 to travel throughout the length thereof. The upper end of the chamber is closed by a cap 21. Slightly below the cap 21 are bored small orifices 22 through which the liquid flows upon entering the spout 23 which is secured to the chamber 20 by means of a suitable hand nut 24. The cover 25 which is affixed to the dispenser by means of lock nuts 26 and 27 serves to both cover the liquid reservoir and support the dispenser.

When liquid is forced by the action of the piston 6 into the pipe 14 it forces the ball valve 19 from its seat and carries it above the outlet openings 22 where it stays until the completion of the piston stroke. When said stroke is completed and the piston 6 is returned to normal position by the spring 8, the ball valve 19 returns to its seat at the bottom of the chamber 20 forcing on its way down most of the liquid in the chamber into the pipe 14 and drawing some liquid from the spout 23 into the chamber 20. The return of the piston 6 to its normal position also draws the liquid into the piston barrel through the opening of the valve 11. In this manner the dispenser is recharged for operation again, and by means of the check valve 19 the liquid is retained in the pipe 14. By the drawing of the liquid in the spout 23 when the ball valve 19 falls the liquid in the spout 23 is lowered slightly, thus preventing dripping.

From the foregoing description it will be seen that among the further advantages of the improvements are that they make possible a shorter stroke of the piston, due to the retention of liquid in the discharge conduit and spout, and that the suction of the up stroke of the piston will draw in from the reservoir substantially all of the liquid to be dispensed on the next down stroke, leaving the column of liquid in the dispensing conduit, and insuring the dispensing of an accurately measured quantity of liquid with each reciprocation of the plunger.

I claim:

1. A liquid dispensing device for dispensing liquid from a reservoir comprising a tube in communication with the reservoir, a piston therein and means for actuating said piston, means for preventing the return of liquid from said tube to said reservoir, a dispensing conduit communicating with said tube and extending therefrom, a check valve plug in said conduit adapted to travel and to seat therein and a seat for said plug in said conduit, said conduit having liquid orifices within the range of the travel of said plug, said conduit having an internal diameter and cross sectional shape corresponding substantially to said plug in the portion in which said plug travels, said plug being movable from its seat to a point beyond said orifices by pressure of the liquid forced through the conduit by the plunger.

2. A liquid dispensing device for dispensing liquid from a reservoir comprising a tube in communication with the reservoir, a piston therein and means for actuating said piston, means for preventing the return of liquid from said tube to said reservoir, a dispensing conduit communicating with said tube and extending therefrom, a check valve plug in said conduit adapted to travel and to seat therein and a seat for said plug in said conduit, said conduit having liquid orifices within the range of the travel of said plug, said conduit having an internal diameter and cross sectional shape corresponding substantially to said plug in the portion in which said plug travels, said plug being movable from its seat to a point beyond said orifices by pressure of the liquid forced through the conduit by the plunger, a discharge spout in communication with said orifices and adapted to discharge liquid expelled therethrough and to drain therethrough back into the conduit when pressure on the column of liquid therein by the plunger is removed.

3. A liquid dispensing device for dispensing liquid from a reservoir comprising a tube in communication with the reservoir, a piston therein and means for actuating said piston, means for preventing the return of liquid from said tube to said reservoir, a dispensing conduit communicating with said tube and extending therefrom, a check valve plug in said conduit adapted to travel and to seat therein and a seat for said plug in said conduit, said conduit having an internal diameter and cross sectional shape corresponding substantially to said plug in the portion in which said plug travels, and having liquid orifices intermediate the extremities of said portion and removed from said valve seat, said plug being movable from its seat to a point beyond said orifices by pressure of the liquid forced through the conduit by the plunger, a discharge spout in communication with said orifices and adapted to discharge liquid expelled therethrough and to drain therethrough back into the conduit when pressure on the column of liquid therein by the plunger is removed, and means for checking the upward movement of the plug after it has passed said orifices, whereby the charge of liquid being dispensed first causes said plug to be unseated and to move beyond said orifices and is discharged therethrough and through the spout and a limited portion of the liquid in the spout is permitted to return through said orifices when the discharging pressure of the plunger ceases and while said plug is returning to its seat but the remainder of the liquid in the conduit and the spout above said seat is held therein by the seating of said plug.

HENRY SELITZKY.